United States Patent
Ikeda et al.

(10) Patent No.: US 12,494,553 B2
(45) Date of Patent: Dec. 9, 2025

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shuya Ikeda, Osaka (JP); Osamu Nakayama, Osaka (JP); Nobuyuki Matsumura, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 164 days.

(21) Appl. No.: 18/681,986

(22) PCT Filed: Aug. 10, 2022

(86) PCT No.: PCT/JP2022/030532
§ 371 (c)(1),
(2) Date: Feb. 7, 2024

(87) PCT Pub. No.: WO2023/026863
PCT Pub. Date: Mar. 2, 2023

(65) Prior Publication Data
US 2024/0405379 A1 Dec. 5, 2024

(30) Foreign Application Priority Data
Aug. 25, 2021 (JP) .................. 2021-136867

(51) Int. Cl.
*H01M 50/59* (2021.01)
*H01M 50/298* (2021.01)
(Continued)

(52) U.S. Cl.
CPC ....... *H01M 50/519* (2021.01); *H01M 50/298* (2021.01); *H01M 50/507* (2021.01);
(Continued)

(58) Field of Classification Search
CPC ............. H01M 50/519; H01M 50/507; H01M 50/298; H01M 50/583; H05K 1/11; B60R 16/033
(Continued)

(56) References Cited

U.S. PATENT DOCUMENTS

2017/0328783 A1* 11/2017 Okamoto ............ H01M 50/528
2017/0352859 A1 12/2017 Okamoto
(Continued)

FOREIGN PATENT DOCUMENTS

JP 2016-115616 6/2016
JP 2018-026285 2/2018
(Continued)

OTHER PUBLICATIONS

International Search Report issued in WIPO Patent Application No. PCT/JP2022/030532, dated Nov. 1, 2022, along with an English translation thereof.

*Primary Examiner* — Andargie M Aychillhum
(74) *Attorney, Agent, or Firm* — GREENBLUM & BERNSTEIN, P.L.C.

(57) ABSTRACT

A wiring module is directed to a wiring module configured to be attached to a plurality of power storage elements having electrode terminals. The wiring module includes: a plurality of busbar units: and wires connected to the busbar units. Each of the busbar units includes: a busbar connected
(Continued)

to the electrode terminals; a circuit board; and a fixing means configured to fix the circuit board to the busbar. A conductive path is routed on the circuit board, and the conductive path includes: a connection land electrically connected to the busbar; and a wire land soldered to the corresponding wire. The busbar includes a crimping part that fixes the wire, and the wire is interposed between the crimping part and the circuit board.

8 Claims, 18 Drawing Sheets

(51) Int. Cl.
    *H01M 50/507*     (2021.01)
    *H01M 50/519*     (2021.01)
    *H01M 50/583*     (2021.01)
    *H05K 1/11*     (2006.01)
    *B60R 16/033*     (2006.01)

(52) U.S. Cl.
    CPC ............ H01M 50/583 (2021.01); H05K 1/11 (2013.01); *B60R 16/033* (2013.01); *H01M 2200/103* (2013.01); *H01M 2220/20* (2013.01); *H05K 2201/10181* (2013.01); *H05K 2201/10257* (2013.01); *H05K 2201/10287* (2013.01)

(58) Field of Classification Search
    USPC .......................................................... 174/255
    See application file for complete search history.

(56) References Cited

U.S. PATENT DOCUMENTS

| | | | |
|---|---|---|---|
| 2018/0047968 | A1 | 2/2018 | Ota et al. |
| 2018/0248280 | A1* | 8/2018 | Takahashi ........... H01M 50/503 |
| 2019/0140244 | A1 | 5/2019 | Mochizuki et al. |

FOREIGN PATENT DOCUMENTS

| | | |
|---|---|---|
| JP | 2018-206638 | 12/2018 |
| JP | 2019-087434 | 6/2019 |
| WO | 2022/107567 | 5/2022 |

* cited by examiner

WIRING MODULE

TECHNICAL FIELD

The present disclosure relates to a wiring module.

BACKGROUND ART

Conventionally, in battery packs in electric automobiles, hybrid automobiles, and the like, wiring modules connected to a plurality of electric cells are known. For example, the sensing module disclosed in JP 2016-115616A (see Patent Document 1 below) includes a busbar connection terminal connected to a busbar that connects electrode terminals of a plurality of electric cells, a wire connection terminal connected to a terminal part of a wire, and a fuse that connects the busbar connection terminal and the wire connection terminal. The busbar connection terminal, the wire connection terminal, and the fuse are formed as one piece and are housed in a synthetic resin housing. Furthermore, this housing is held by a resin protector made of a synthetic resin.

CITATION LIST

Patent Document

Patent Document 1: JP 2016-115616A

SUMMARY OF INVENTION

Technical Problem

If the configuration of the above-described sensing module is desired to be simplified, it is conceivable to use a circuit board on which the fuse is mounted. That is to say, a possible configuration of the sensing module is such that a circuit board is provided, and the circuit board includes: a busbar connection portion connected to the busbar; a wire connection portion connected to the wire; and the fuse provided between the busbar connection portion and the wire connection portion.

Meanwhile, in a wiring module including a wire and a circuit board that are electrically connected to each other, application of a stress to the wire may lose the electrical connection between the wire and the circuit board.

Solution to Problem

According to the present disclosure, a wiring module configured to be attached to a plurality of power storage elements having electrode terminals includes: a plurality of busbar units; and wires connected to the busbar units, wherein each of the busbar units includes: a busbar connected to the electrode terminals; a circuit board, and a fixing means configured to fix the circuit board to the busbar, a conductive path is routed on the circuit board, the conductive path includes: a connection land electrically connected to the busbar; and a wire land soldered to the corresponding wire, the busbar includes a crimping part that fixes the wire, and the wire is interposed between the crimping part and the circuit board.

Advantageous Effects of Invention

According to the present disclosure, it is possible to provide a wiring module in which electrical connection between a wire and a circuit board is less likely to be lost.

DESCRIPTION OF EMBODIMENTS

Description of Embodiments of Present Disclosure

Figure 1:
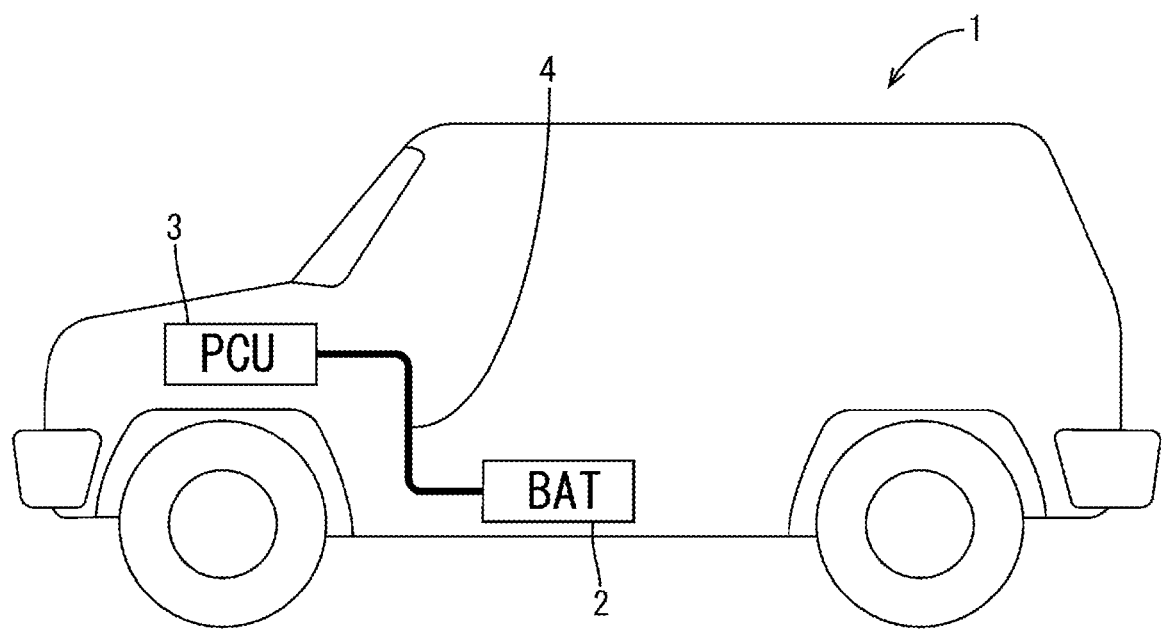
FIG. 1 is a schematic view illustrating a vehicle on which a power storage module according to Embodiment 1 is mounted.

First, embodiments of the present disclosure will be listed and described.

(1) According to the present disclosure, a wiring module configured to be attached to a plurality of power storage elements having electrode terminals includes: a plurality of busbar units; and wires connected to the busbar units, wherein each of the busbar units includes: a busbar connected to the electrode terminals; a circuit board, and a fixing means configured to fix the circuit board to the busbar, a conductive path is routed on the circuit board, the conductive path includes: a connection land electrically connected to the busbar; and a wire land soldered to the corresponding wire, the busbar includes a crimping part that fixes the wire, and the wire is interposed between the crimping part and the circuit board.

With such a configuration, the wire is fixed by the crimping part and the circuit board, and thus electrical connection between the wire and the circuit board is not likely to be lost even when an external force is applied to the wire.

(2) Preferably, the circuit board includes a fixing part that holds and fixes the wire in cooperation with the crimping part, the circuit board has a first surface on which the wire land is formed, and the fixing part is in contact with the wire on the first surface.

With this configuration, the wire land is formed on the first surface of the circuit board, and the fixing part that holds and fixes the wire in cooperation with the crimping part is in contact with the wire on the first surface, and thus the wire does not need to be bent between the wire land and the fixing part. Accordingly, when the wire is soldered and then is fixed by the crimping part and the fixing part, solder crack is prevented. Also, when the wire is fixed by the crimping part and the fixing part and then the wire is soldered, the soldering is easy.

(3) Preferably, the circuit board has a second surface located on a side opposite to the first surface, and the fixing part is in contact with the busbar on the second surface.

With this configuration, since the fixing part is in contact with the busbar on the second surface, it is possible to support the fixing part using the busbar. Also, the state in which the wire is fixed by the crimping part and the fixing part can further be stabilized.

(4) Preferably, the circuit board includes a cutout formed in the vicinity of the crimping part.

With this configuration, it is possible to discharge fluid attached to the circuit board from the cutout. Accordingly, the conductive path is prevented from short-circuiting via fluid on the circuit board.

(5) Preferably, the crimping part is disposed inside the cutout.

With this configuration, the cutout enables positioning of the busbar and the circuit board.

(6) Preferably, the above-described wiring module further includes a protector configured to hold the busbars, wherein the circuit boards have a clearance between the circuit boards and the protector.

With this configuration, it is possible to handle the plurality of busbar units as one piece using the protector. Also, by providing a clearance between the circuit boards and the protector, the circuit boards are not likely to be subjected to a stress from the protector, making it possible to prevent solder crack.

(7) Preferably, the conductive path includes a chip fuse provided between the connection land and the wire land.

With this configuration, even if conductive paths short-circuit and an overcurrent occurs, it will be possible to restrict the overcurrent from flowing from the corresponding power storage elements to the conductive paths.

(8) Preferably, the busbar has a first fixation hole, the circuit board has a second fixation hole, the fixing means is a rivet, and the rivet includes a shaft portion configured to be inserted into the first fixation hole and the second fixation hole, and a head portion that is formed at an end of the shaft portion and has a diameter greater than hole diameters of the first fixation hole and the second fixation hole.

With this configuration, it is possible to fix the circuit board to the busbar with the rivet.

(9) The above-described wiring module is a vehicular wiring module configured to be electrically attached to the plurality of power storage elements mounted on a vehicle.

Detail of Embodiments of Present Disclosure

The following will describe embodiments of the present disclosure. The present disclosure is not limited to the examples but is indicated by the claims, and is intended to include all modifications within the meaning and scope equivalent to the claims.

Embodiment 1

The following will describe Embodiment 1 of the present disclosure with reference to FIGS. 1 to 11. A power storage module 10 including a wiring module 20 according to the present embodiment is applied to, for example, a power storage pack 2 installed in a vehicle 1 as shown in FIG. 1. The electric storage pack 2 is installed in the vehicle 1 such as an electric automobile or a hybrid automobile, and is used as a drive source of the vehicle 1. In the following description, there are sometimes cases where reference numerals are added only to some of a plurality of members, and the reference numerals for the remaining members are omitted.

As shown in FIG. 1, the power storage pack 2 is arranged near the center of the vehicle 1. A PCU (Power Control Unit) 3 is arranged in a front portion of the vehicle 1. The power storage pack 2 and the PCU 3 are connected to each other by a wire harness 4. The power storage pack 2 and the wire harness 4 are connected to each other by a not-shown connector. The power storage pack 2 includes the power storage module 10 provided with a plurality of power storage elements 11. The power storage module 10 (and the wiring module 20) can be installed in a suitable orientation, and will be hereinafter described with reference to the drawings, except for FIG. 1, in which the direction indicated by an arrow Z is defined as upward, the direction indicated by an arrow X is defined as forward, and the direction indicated by an arrow Y is defined as leftward.

Power Storage Element and Electrode Terminal

Figure 2:
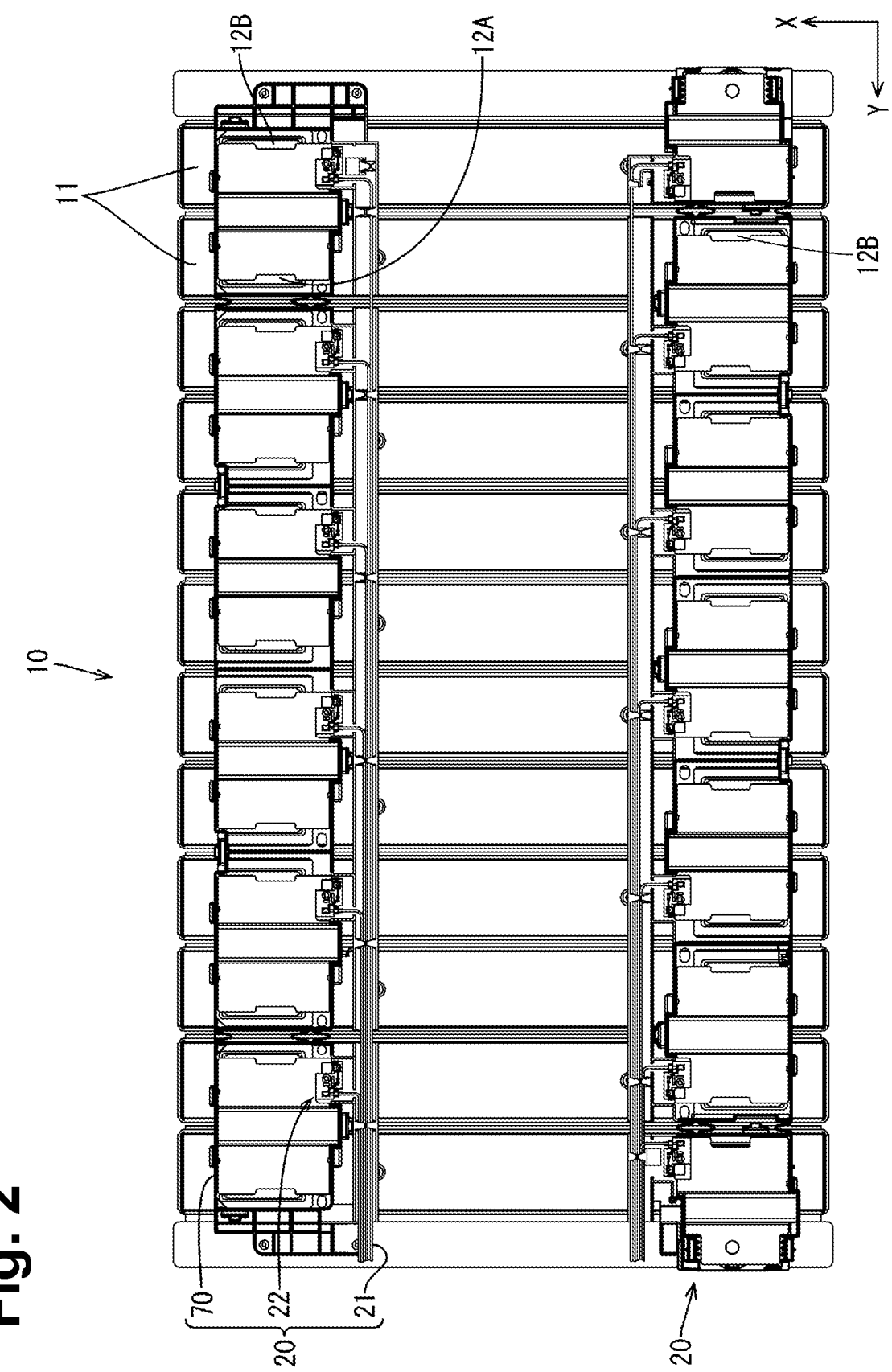
FIG. 2 is a plan view of the power storage module.

As shown in FIG. 2, the power storage module 10 includes the plurality of power storage elements 11 lined up in a left-right direction, and wiring modules 20 fitted to the upper surfaces of the plurality of power storage elements 11. The power storage elements 11 have a flat cuboidal shape. A not-shown power storage element is accommodated inside each of the power storage elements 11. The power storage element 11 includes, on the upper surface thereof, electrode terminals 12A and 12B, which are positive and negative electrodes. The power storage elements 11 are not particularly limited, and may be secondary batteries or capacitors. The power storage elements 11 according to the present embodiment are secondary batteries.

Wiring Module

As shown in FIG. 2, each wiring module 20 includes a plurality of busbar units 22, wires 21 connected to the busbar units 22, and a protector 70 that holds the busbar units 22 and the wires 21. The wiring module 20 is adopted to be attached to front portions or rear portions of the plurality of power storage elements 11. The following will describe in detail a configuration of the wiring module 20 disposed in the front portions of power storage elements 11. Note that, in the wiring module 20 disposed in the rear portions of power storage elements 11, both the front-rear direction and the left-right direction are inverted, but otherwise there is no difference in configuration between the wiring module 20 disposed in the front portions, and the wiring module 20 disposed in the rear portions.

Busbar Unit

Figure 3:
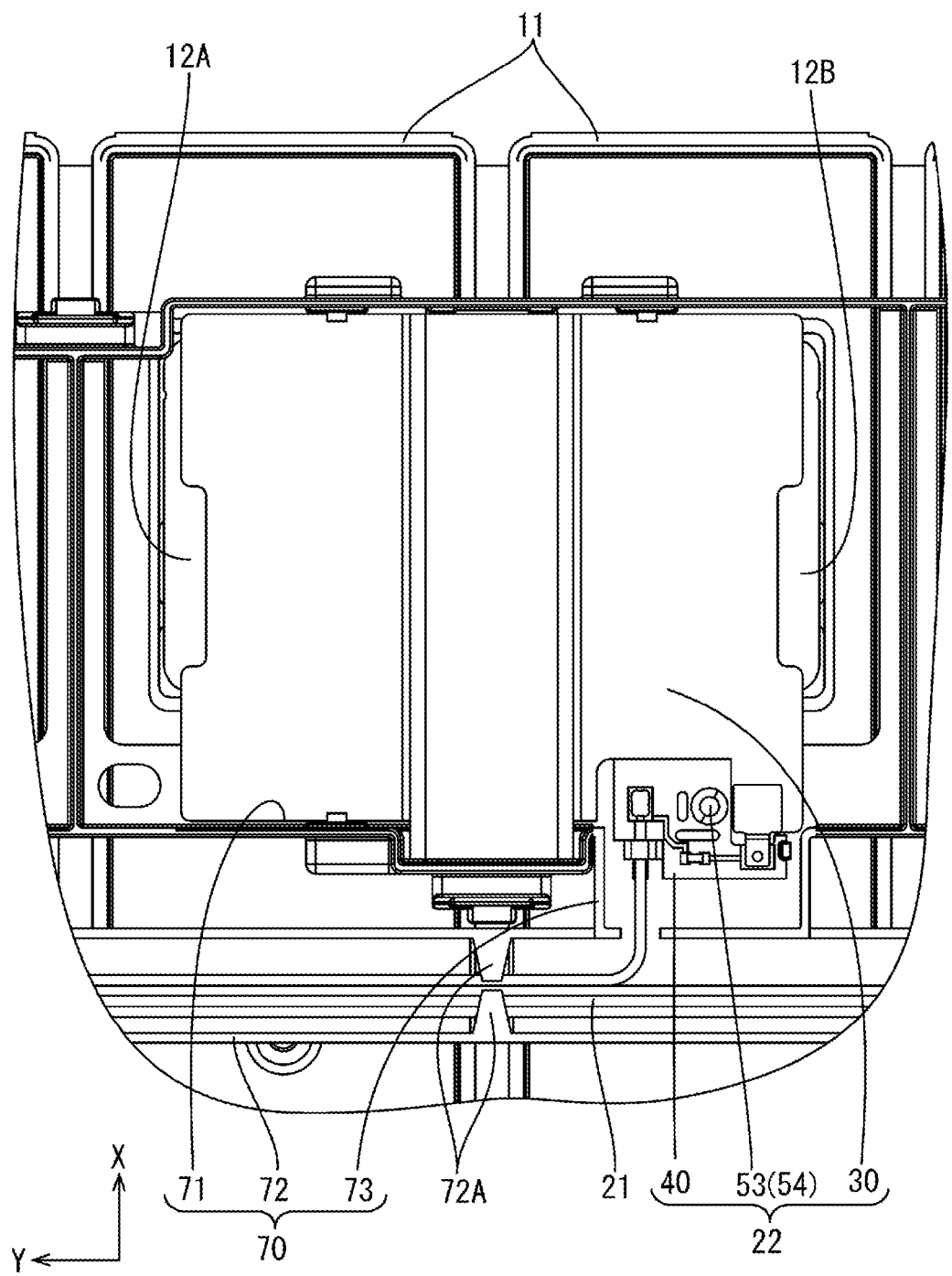
FIG. 3 is an enlarged plan view of the power storage module, illustrating a busbar unit.

As shown in FIG. 3, the busbar unit 22 includes a busbar 30 connected to the electrode terminals 12A and 12B, a circuit board 40 that connects the busbar 30 to the wire 21, and a fixing means 53 that fixes the circuit board 40 to the busbar 30. The circuit board 40 of the busbar unit 22 is connected to the wire 21.

Wire

Figure 4:
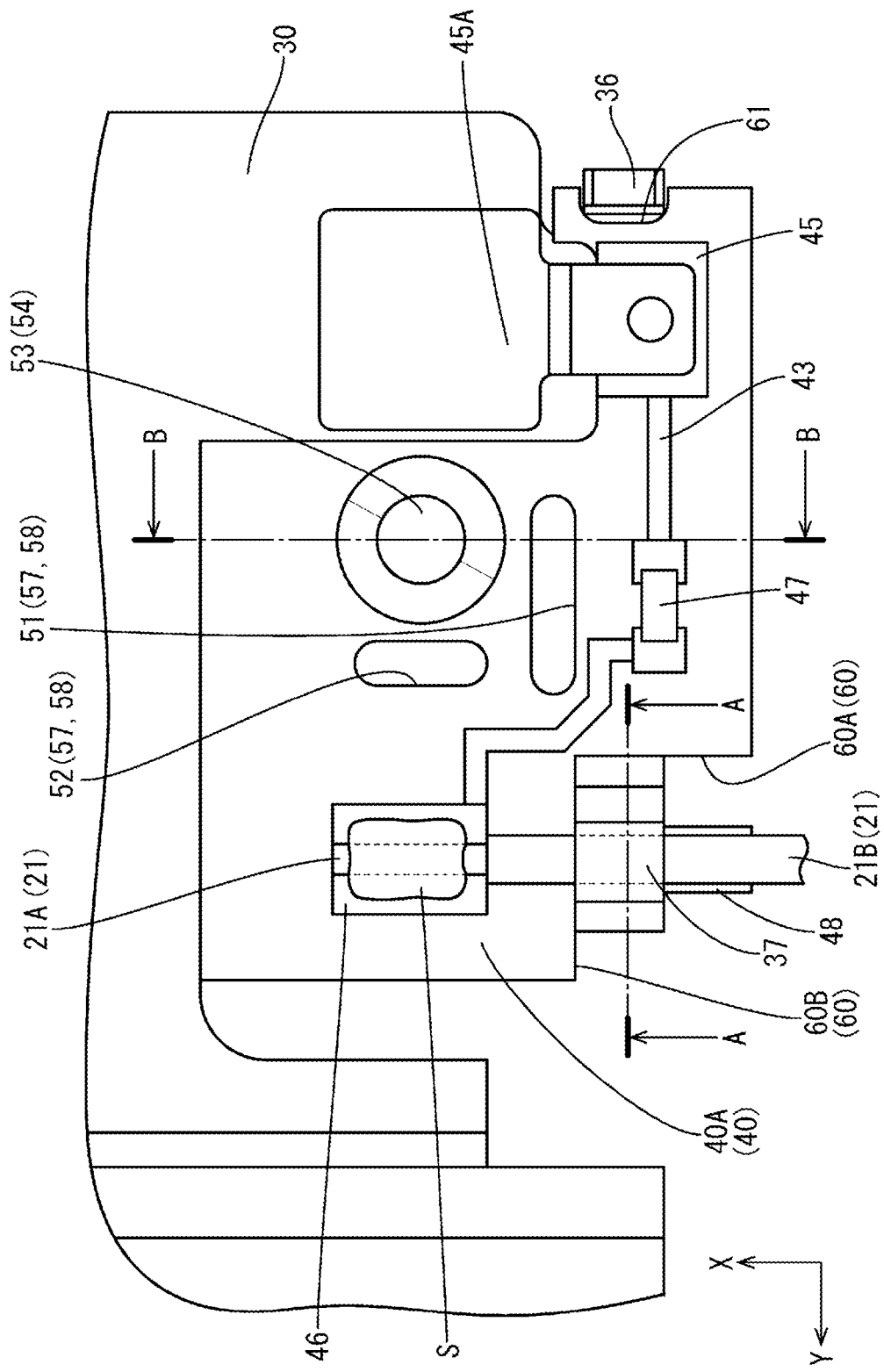
FIG. 4 is an enlarged plan view of the wiring module, illustrating a circuit board.
Figure 5:
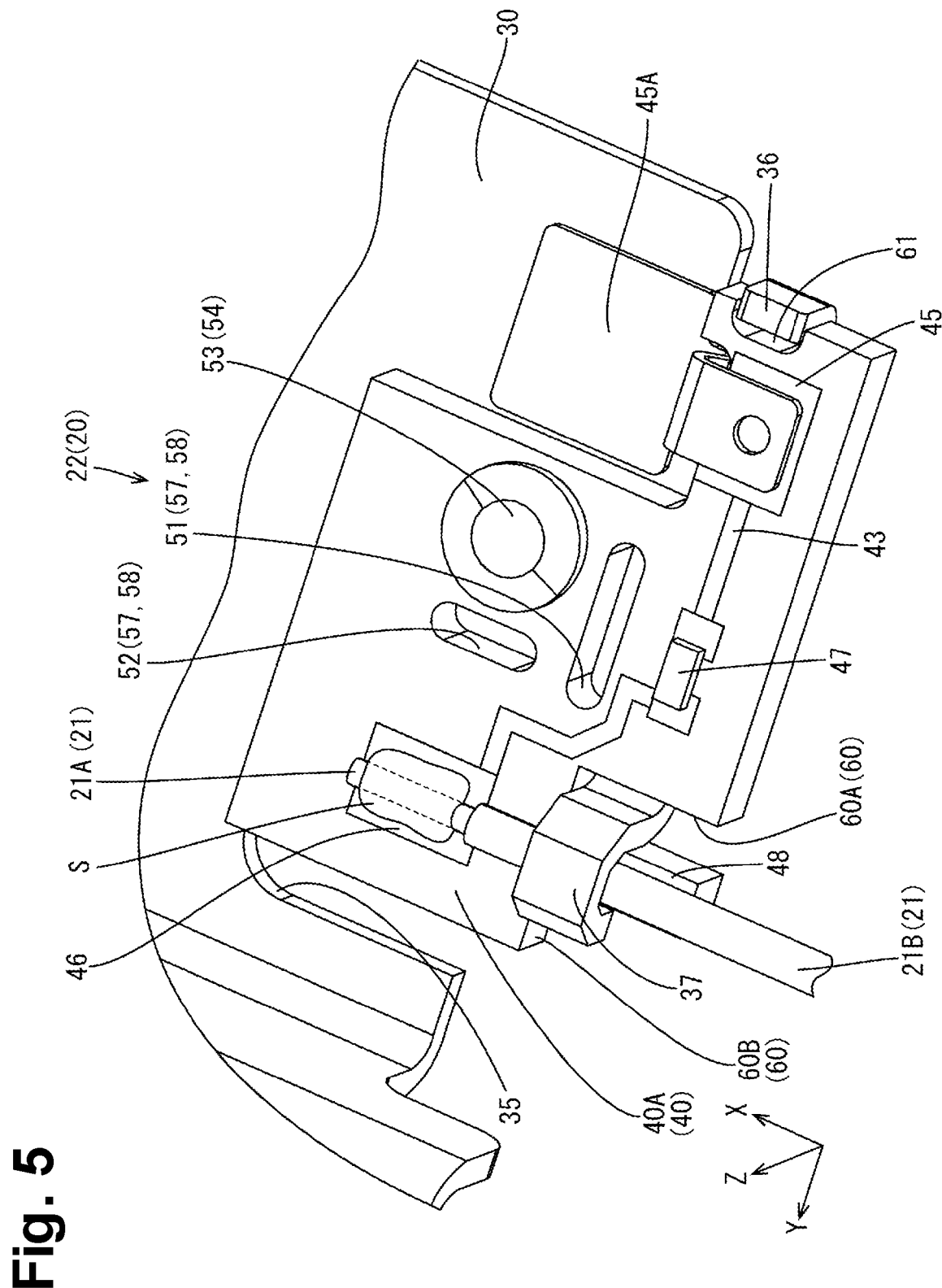
FIG. 5 is an enlarged perspective view of the wiring module, illustrating the circuit board.
Figure 6:
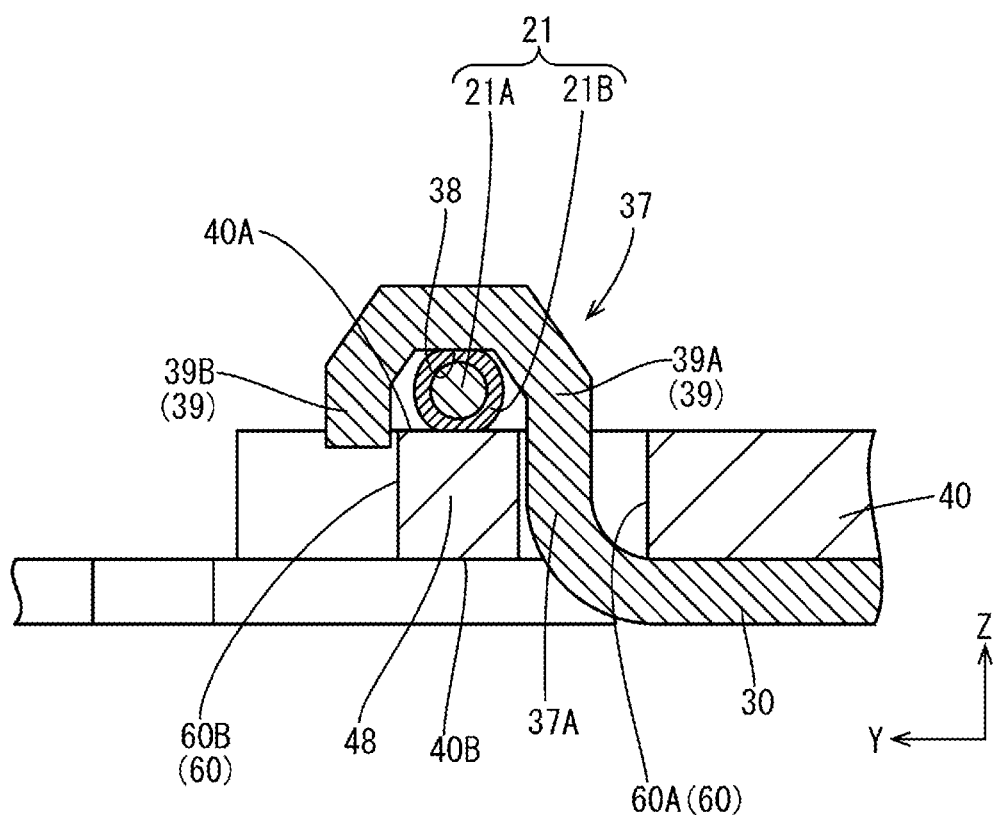
FIG. 6 is a cross-sectional view taken along a line A-A in FIG. 4.

As shown in FIGS. 4 to 6, the wire 21 includes a core wire 21A, and an insulating coating 21B that covers the core wire 21A. As shown in FIGS. 4 and 5, the core wire 21A exposed from one end of the wire 21 is connected to a wire land 46 of the circuit board 40 by a solder S. As shown in FIG. 6, the insulating coating 21B at one end of the wire 21 is interposed between the crimping part 37 and a fixing part 48 of the circuit board 40 substantially in an up-down direction, and is fixed to the busbar 30 and the circuit board 40. Although not shown, the other end of the wire 21 is connected to an external ECU (Electronic Control Unit) or the like via a connector. The ECU is a unit on which a microcomputer, elements, and the like are mounted, and has a well-known configuration having functions of, for example, sensing a voltage, a current, a temperature and the like of the power storage elements 11, controlling charging/discharging of the power storage elements 11, and the like.

Busbar

The busbar 30 is made of a conductive metal plate material. Examples of the metal of which the busbar 30 is made include copper, a copper alloy, aluminum, an aluminum alloy, and stainless steel (SUS). As shown in FIG. 3, the busbar 30 is disposed on the electrode terminals 12A and 12B, and is welded and electrically connected to the electrode terminals 12A and 12B. The busbars 30 include a busbar 30 that connects the electrode terminals 12A and 12B of adjacent power storage elements 11, and a busbar 30 that is connected to all the positive electrodes or the negative electrodes of the plurality of power storage elements 11, but in the following, they are not distinguished from each other.

As shown in FIG. 3, for the busbar 30 disposed in the front portions of the plurality of power storage elements 11, the circuit board 40 is placed at the right rear corner, out of the four corners of the rectangular busbar 30 when viewed in a plan view. The right rear corner portion of the busbar 30 in which the circuit board 40 is placed is defined as a circuit board placement portion 33 (see FIG. 9).

First Fixation Hole and Crimping Part

Figure 9:
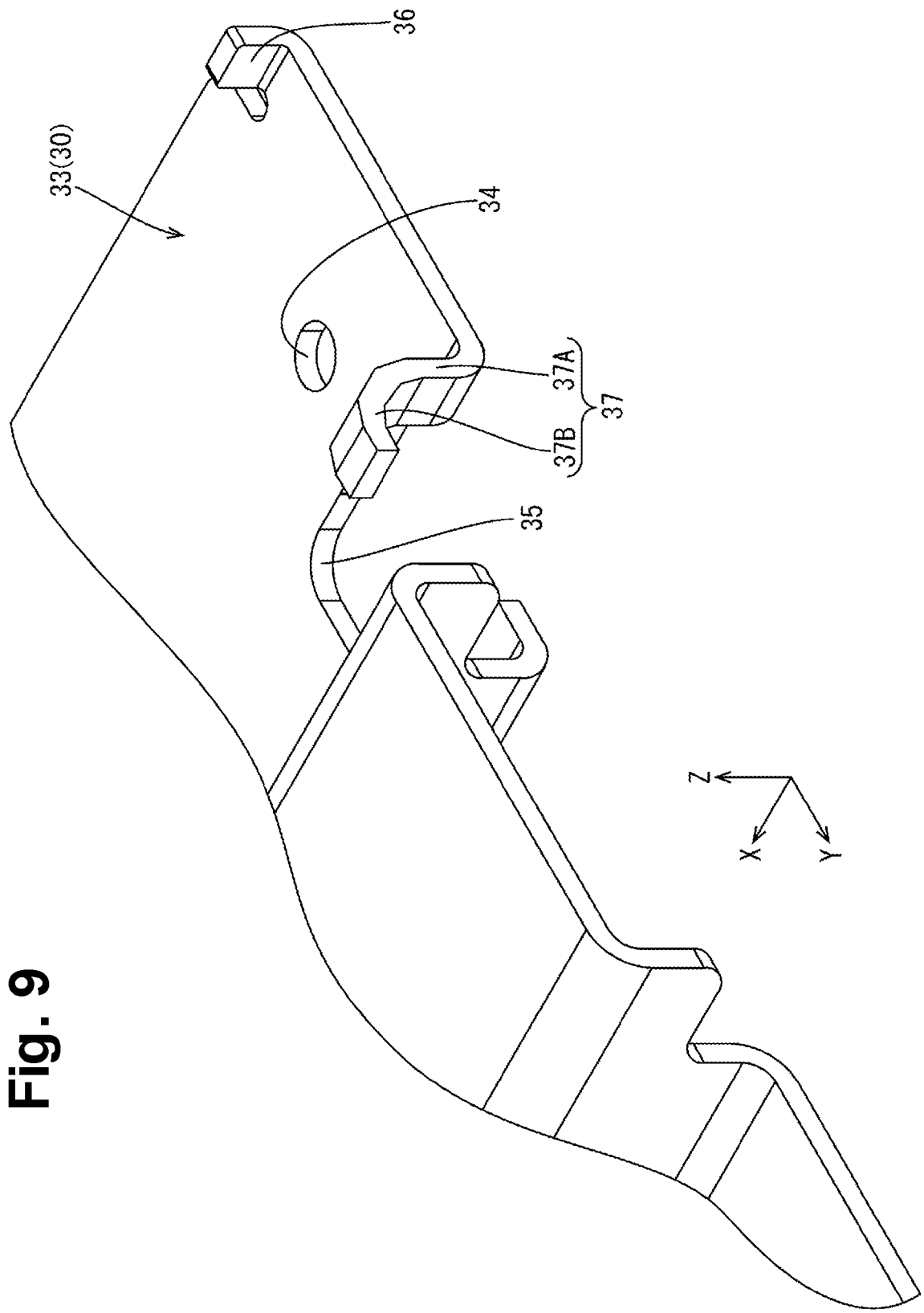
FIG. 9 is an enlarged perspective view of a busbar, illustrating a circuit board placement portion.

As shown in FIG. 9, the circuit board placement portion 33 of the busbar 30 includes: a first fixation hole 34 passing through the busbar 30 in the up-down direction; a recess 35 recessed inward from an outer edge portion of the busbar 30; a positioning projection 36 projecting upward from the upper surface of the circuit board placement portion 33; and the crimping part 37. The first fixation hole 34 is located at almost the center of the circuit board placement portion 33. The recess 35 is formed on the left side of the circuit board placement portion 33. The positioning projection 36 is arranged at the right end of the circuit board placement portion 33. The crimping part 37 is provided on the rear side of the recess 35.

Figure 7:
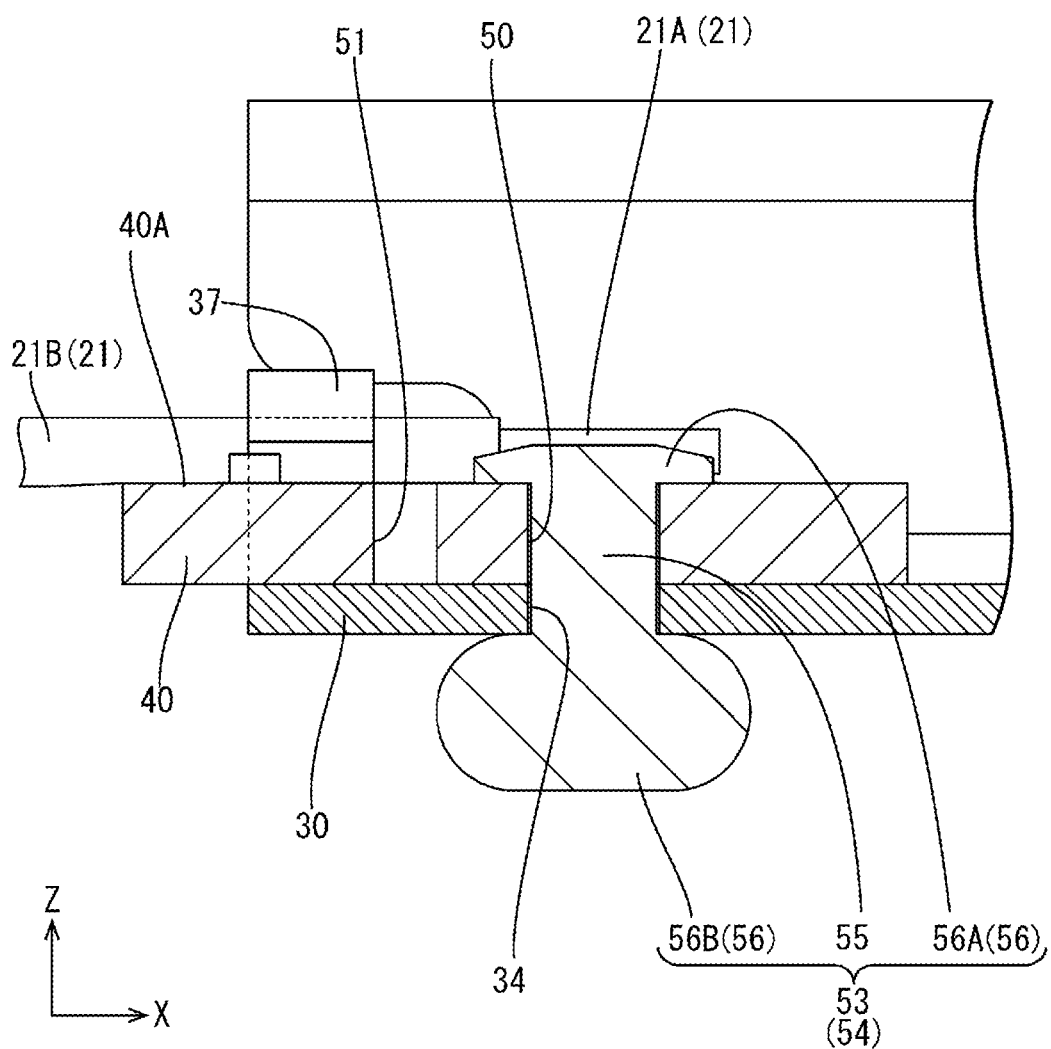
FIG. 7 is a cross-sectional view taken along a line B-B in FIG. 4.

As shown in FIG. 7, a fixing means 53 (rivet 54) is inserted through the first fixation hole 34. As shown in FIG. 5, the positioning projection 36 is received in a positioning recess 61 in the circuit board 40 to position the busbar 30 and the circuit board 40. The recess 35 is located in the surroundings of the wire land 46 of a conductive path 43. Accordingly, the spatial distance between the busbar 30 and the wire land 46 is ensured, which prevents a short-circuit of the busbar 30 and the conductive path 43.

Figure 10:
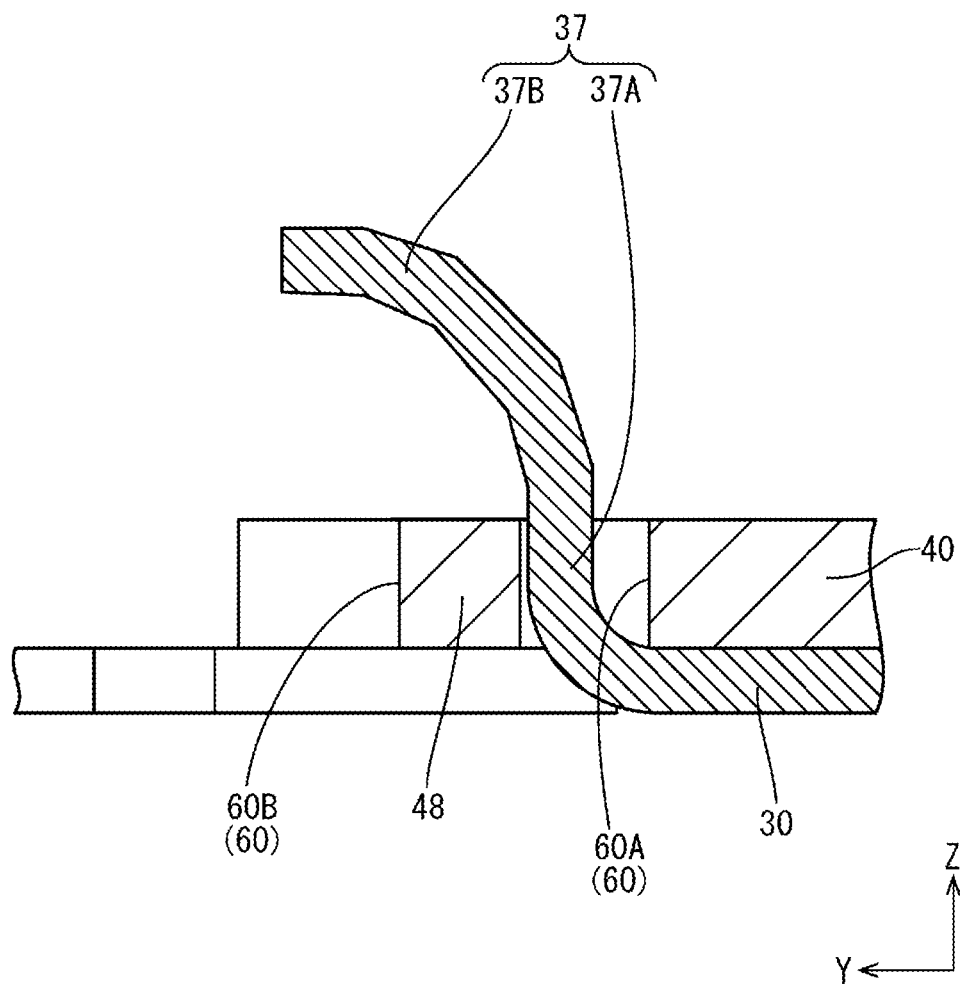
FIG. 10 illustrates a state in which a circuit board is placed in the circuit board placement portion, in the cross-sectional view taken along the line A-A in FIG. 4.
Figure 11:
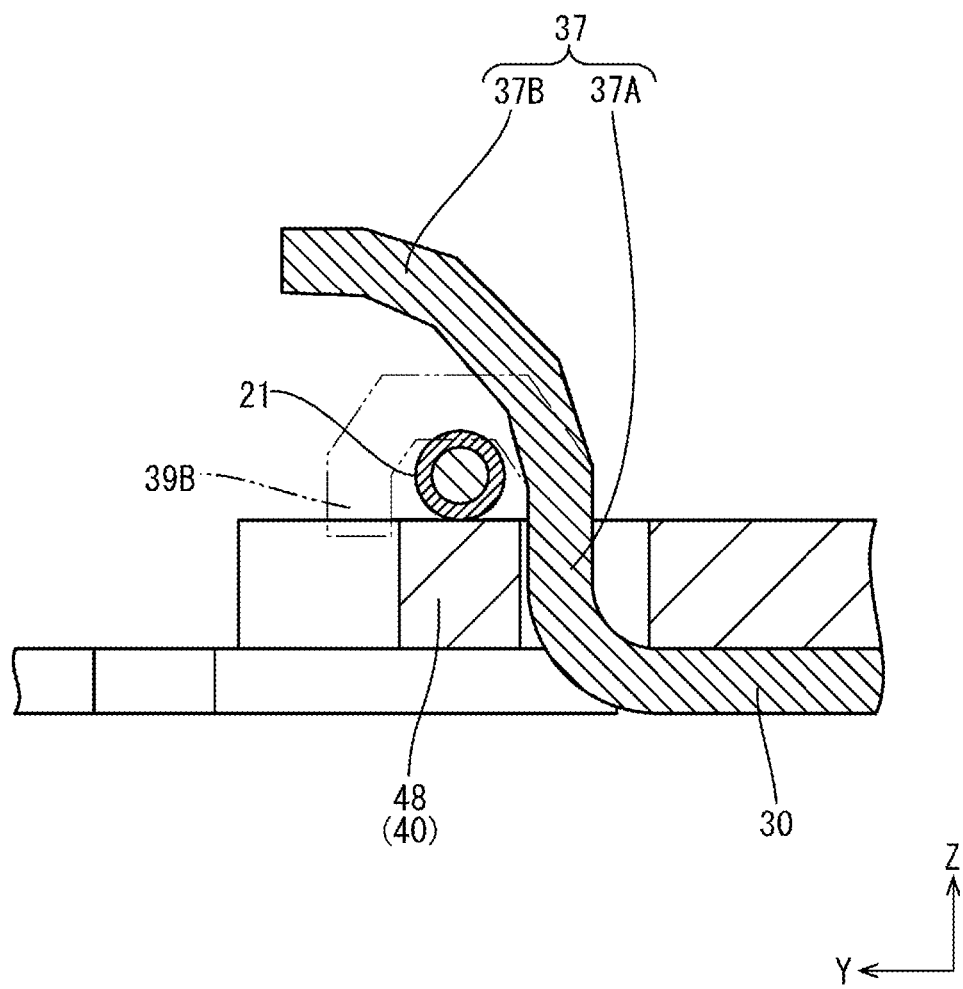
FIG. 11 illustrates how a wire is crimped by a crimping part, in the cross-sectional view taken along the line A-A in FIG. 4.

As shown in FIG. 9, the crimping part 37 includes a rising portion 37A rising upward from the upper surface of the circuit board placement portion 33, and a bent portion 37B provided on the leading end side relative to the rising portion 37A. The bent portion 37B is gently bent leftward. As shown in FIG. 10, the crimping part 37 as a whole is crank-shaped when viewed in the front-rear direction. As shown in FIG. 11, the bent portion 37B is bent so as to cover the wire 21 placed on the circuit board 40 from above, and the leading end of the crimping part 37 is located to the left of the wire 21. By bending the bent portion 37B in this way, the wire 21 is interposed between the crimping part 37 and the fixing part 48 of the circuit board 40 substantially in the up-down direction, and is fixed to the busbar 30 and the circuit board 40.

In a state in which the wire 21 is fixed by the crimping part 37 as shown in FIG. 6, the crimping part 37 includes a pressing portion 38 that presses the wire 21, and a position restricting portion 39 that restricts the wire 21 from disengaging from the pressing portion 38 and the fixing part 48. The distance between the pressing portion 38 and the fixing part 48 is smaller than the diameter of the wire 21, and the pressing portion 38 and the fixing part 48 hold the wire 21 substantially from both sides in the up-down direction so that the wire 21 is in a compressed state. In FIG. 6, the pressing portion 38 and the circuit board 40 are parallel to each other, but the pressing portion 38 does not need to be parallel to the circuit board 40. It is sufficient that the pressing portion 38 is disposed so as to face the fixing part 48 in the up-down direction. The position restricting portion 39 is composed of a first position restricting portion 39A on the base end side of the crimping part 37, and a second position restricting portion 39B on the leading end side of the crimping part 37. The position restricting portion 39 extends downward from the pressing portion 38.

In the illustration of FIG. 11, the bent portion 37B is totally bent, but the bent portion 37B may be configured to be locally bent. For example, a configuration is also possible in which the second position restricting portion 39B on the leading end side of the crimping part 37 is formed in advance, and when fixing the wire 21 using the crimping part 37, only the bent portion 37B on the base end side is bent.

Circuit Board and Conductive Path

Figure 8:
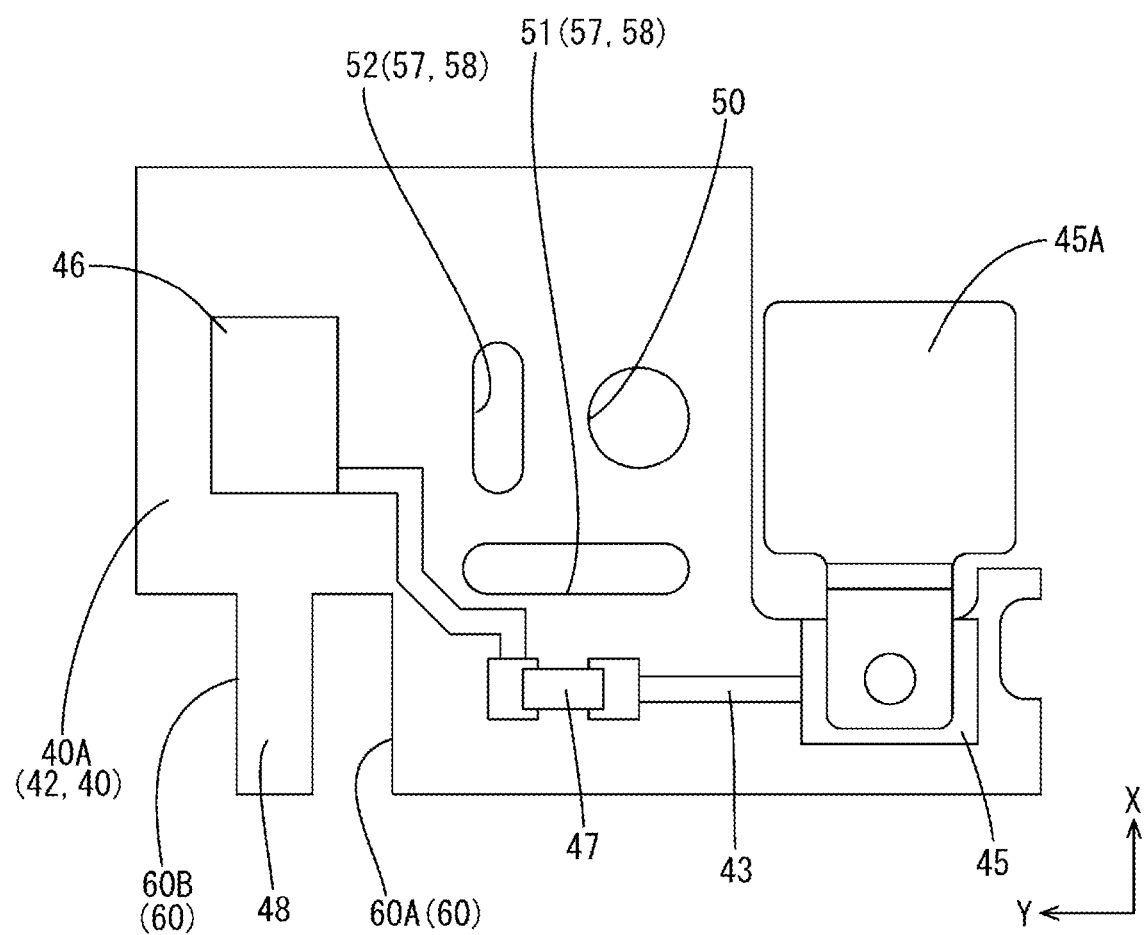
FIG. 8 is a plan view illustrating the circuit board.

As shown in FIG. 8, the circuit board 40 is a hard board, and includes an insulating plate 42 having insulation properties, and the conductive path 43 formed on the insulating plate 42. The conductive path 43 is formed on the upper surface 40A (an example of a first surface) of the circuit board 40. As shown in FIG. 6, the surface of the circuit board 40 opposite to the upper surface 40A is defined as a lower surface 40B. The insulating plate 42 is formed, for example, by impregnating glass fiber cloth with an epoxy resin and hardening the epoxy resin. The conductive path 43 is made of, for example, metal such as copper or a copper alloy, and is conductive. Note that, although not shown, the conductive path 43 is covered with an insulating layer except for a portion that is soldered with the wire 21 and the like. The insulating layer is made of a synthetic resin such as polyimide. As shown in FIG. 8, the conductive path 43 includes a connection land 45 provided at one end of the conductive path 43, the wire land 46 provided at the other end of the conductive path 43, and a chip fuse 47 provided between the connection land 45 and the wire land 46.

Connection Land and Wire Land

As shown in FIGS. 4 and 5, the connection land 45 is formed on a right-side portion of the circuit board 40. The connection land 45 is electrically connected to the busbar 30 via a small metal piece 45A made of copper or the like. The connection land 45 and the small metal piece 45A are connected to each other by soldering, and the busbar 30 and the small metal piece 45A are connected to each other by welding. The wire land 46 is formed on a left-side portion of the circuit board 40. The wire land 46 is connected to a core wire 21A of the wire 21 by soldering.

Chip Fuse

As shown in FIGS. 4 and 5, the chip fuse 47 is provided in the conductive path 43 at a position midway from the connection land 45 to the wire land 46. The chip fuse 47 and the conductive path 43 are connected to each other by soldering. Although not specifically shown, one of a pair of electrodes of the chip fuse 47 is connected to the conductive path 43 at a position on the connection land 45 side, and the other electrode is connected to the conductive path 43 at a position on the wire land 46 side.

As a result of the chip fuse 47 being provided, even if, due to a defect in an external circuit to which the power storage module 10 is connected, conductive paths 43 short-circuit and an overcurrent occurs, it will be possible to restrict the overcurrent from flowing from the corresponding power storage elements 11 to the conductive paths 43.

Second Fixation Hole

As shown in FIG. 8, the circuit board 40 has, in the central portion thereof, a second fixation hole 50 that passes through the circuit board 40 in the up-down direction. Behind the second fixation hole 50, a first through hole 51 is provided that passes through the circuit board 40 in the up-down direction, and has a long hole shape extending in the left-right direction. The first through hole 51 is formed between the second fixation hole 50 and the chip fuse 47. On the left side of the second fixation hole 50, a second through hole 52 is provided that passes through the circuit board 40 in the up-down direction, and has a long hole shape extending in the front-rear direction. The second through hole 52 is formed between the second fixation hole 50 and the wire land 46.

Fixing Means, Rivet, Shaft portion, and Head Portion

As shown in FIG. 7, the rivet 54, which is the fixing means 53 of the present embodiment, is inserted into the first fixation hole 34 and the second fixation hole 50, and the busbar 30 and the circuit board 40 are fixed to each other by the rivet 54. The rivet 54 has a shaft portion 55 inserted into the first fixation hole 34 and the second fixation hole 50, and head portions 56 that are formed at ends of the shaft portion 55 and have diameters greater than the hole diameter of the first fixation hole 34 and the second fixation hole 50. The head portion 56 formed at the upper end of the shaft portion 55 is defined as an upper head portion 56A, and the head portion 56 formed at the lower end of the shaft portion 55 is defined as a lower head portion 56B. The rivet 54 of the present embodiment is made of a metal in view of strength, but may be made of a synthetic resin.

Although not shown, the rivet 54 before being fixed to the busbar 30 and the circuit board 40 has the shaft portion 55 and the upper head portion 56A, and the lower head portion 56B is not formed. The lower head portion 56B is formed when the shaft portion 55 at which no lower head portion 56B is formed is inserted into the first fixation hole 34 and the second fixation hole 50, and is crimped.

Since the rivet 54 is made of metal, the rivet 54 may have the same potential as that of the busbar 30, and may thus have a high voltage. In the present embodiment, as shown in FIGS. 4 and 5, the first through hole 51 and the second through hole 52 are formed while surrounding the rivet 54. Accordingly, the first through hole 51 and the second through hole 52 increase the creepage distance between the rivet 54 and the conductive path 43, and prevent a short-circuit between the busbar 30 and the conductive path 43. Therefore, the first through hole 51 and the second through hole 52 function as insulation holes 57. Also, the first through hole 51 and the second through hole 52 function as drainage holes 58 for discharging fluid attached to the circuit board 40 due to dew condensation.

Fixing Part

As shown in FIG. 8, the circuit board 40 has the fixing part 48 behind the wire land 46. As shown in FIG. 6, the fixing part 48 is configured to hold and fix the insulating coating 21B of the wire 21 substantially in the up-down direction, in cooperation with the pressing portion 38 of the crimping part 37. The fixing part 48 is in contact with the insulating coating 21B on the upper surface 40A of the circuit board 40. That is to say, as shown in FIG. 5, both the portion of the fixing part 48 that is in contact with the insulating coating 21B, and the wire land 46 to which the core wire 21A is soldered belong to the upper surface 40A of the circuit board 40. Accordingly, the insulating coating 21B is configured to be disposed on the circuit board 40 while extending from the fixing part 48 to the rear end portion of the wire land 46 along the upper surface 40A of the circuit board 40. That is to say, when viewed in the left-right direction, as shown in FIG. 7, the insulating coating 21B is in a substantially horizontal orientation from the portion held by the crimping part 37 and the circuit board 40 to the portion at which the core wire 21A is exposed.

The wire 21 extends from the wire land 46 to the fixing part 48 along the upper surface 40A of the circuit board 40, and thus even if the insulating coating 21B is interposed between the crimping part 37 and the fixing part 48 substantially in the up-down direction, the core wire 21A of the wire 21 is not likely to move. Accordingly, when the core wire 21A is soldered with the wire land 46, and then the insulating coating 21B is held between the crimping part 37 and the fixing part 48, a stress is not likely to be applied to the solder S and the solder S is not likely to be cracked. Also, when the insulating coating 21B is held between the crimping part 37 and the fixing part 48, and then the core wire 21A is soldered to the wire land 46, the core wire 21A is not likely to rise and thus soldering is easy.

Cutout

As shown in FIGS. 4 and 5, in outer edge portions of the circuit board 40, the positioning recess 61 and a cutout 60 that are recessed inward from the outer edge portion are provided. The positioning recess 61 is provided to the right of the connection land 45. The positioning recess 61 receives the positioning projection 36 of the busbar 30, and positions the busbar 30 and the circuit board 40. The cutout 60 is provided in the vicinity of the crimping part 37.

As shown in FIG. 8, the cutout 60 of the present embodiment is composed of a first cutout 60A located on the right side of the fixing part 48, and a second cutout 60B located on the left side of the fixing part 48. As shown in FIG. 6, the rising portion 37A of the crimping part 37 is disposed inside the first cutout 60A. The second cutout 60B is disposed so as to accommodate the leading end of the crimping part 37. That is to say, in FIG. 6, the leading end of the crimping part 37 enters the inside of the second cutout 60B, but there may be a case where the leading end of the crimping part 37 is not disposed inside the second cutout 60B depending on the diameter of the wire 21 or the pressed amount of the crimping part 37.

As a result of the cutout 60 being formed in the circuit board 40, it is possible to position the crimping part 37 with respect to the circuit board 40. Also, as a result of fluid attached to the circuit board 40 or the crimping part 37 being discharged from the cutout 60, it is possible to prevent the busbar 30 and the conductive path 43 from short-circuiting via fluid.

Protector

The protector 70 is made of an insulating synthetic resin. As shown in FIG. 2, the protector 70 extends in the left-right direction, and holds the busbar units 22 and the wires 21. Note that the protector 70 of the wiring module 20 is shown only in FIGS. 2 and 3. As shown in FIG. 3, the protector 70 includes a busbar accommodation recess 71 in which the busbar 30 is accommodated. The busbar accommodation recess 71 is frame-shaped, and an opening (not shown) is formed in the bottom of the busbar accommodation recess 71. The busbar 30 is connected to the electrode terminals 12A and 12B via the opening. Although not specifically shown, the busbar accommodation recess 71 includes a locking part or the like, and holds the busbar 30 in a positioned state.

As shown in FIG. 3, the protector 70 has a wire routing recess 72 in which the wires 21 are routed. The wire routing recess 72 has the shape of a groove extending in the left-right direction. Wire locking pieces 72A are provided on bottom walls of the wire routing recess 72. The wire locking pieces 72A lock one or more wires 21 inside the wire routing recess 72. The busbar accommodation recess 71 and the wire routing recess 72 are coupled to each other in the front-rear direction by a groove-shaped coupling part 73.

As shown in FIG. 3, the circuit board 40 of the busbar unit 22 is provided at a distance from the walls constituting the protector 70, specifically, the busbar accommodation recess 71 and the coupling part 73. That is to say, the circuit board 40 has a clearance between the circuit board 40 and the protector 70. With this, the circuit board 40 is not likely to be subjected to a stress from the protector 70.

Method for Manufacturing Wiring Module of the Present Embodiment

The following will describe an example of a method for manufacturing the wiring module 20 according to the present embodiment.

First, the circuit board 40 is manufactured using a printed wiring technique. The chip fuse 47 and the small metal piece 45A are soldered to the circuit board 40 in a reflow process.

The circuit board 40 (see FIG. 8) on which the chip fuse 47 and the like are mounted is fixed to the busbar 30 with the rivet 54. By inserting the shaft portion 55 into the first fixation hole 34 in the busbar 30 and the second fixation hole 50 in the circuit board 40, and crimping the shaft portion 55, the lower head portion 56B is formed. The rivet 54 after formation of the lower head portion 56B is designed such that the dimension of the shaft portion 55 in the up-down direction matches the sum of the dimensions of the busbar 30 and the circuit board 40 in the up-down direction (see FIG. 7). When fixing the circuit board 40 to the busbar 30, the positioning projection 36 of the busbar 30 is disposed inside the positioning recess 61, and the rising portion 37A is positioned inside the first cutout 60A (see FIG. 10). With this, the circuit board 40 and the busbar 30 are positioned. Then, the small metal piece 45A and the busbar 30 are connected to each other by welding. With this, the manufacturing of the busbar unit 22 is complete.

Subsequently, a wire 21 is connected to the busbar unit 22. The core wire 21A of the wire 21 is soldered to the wire land 46. After the wire 21 has been soldered, the wire 21 is attached and interposed between the crimping part 37 and the fixing part 48 (see FIG. 11). By bending the bent portion 37B of the crimping part 37, the pressing portion 38 and the position restricting portion 39 are formed. As shown in FIG. 6, the wire 21 is interposed between the pressing portion 38 and the upper surface 40A of the fixing part 48, and is fixed to the busbar 30 and the circuit board 40. Since the position restricting portion 39 is provided on both left and right sides of the wire 21, the wire 21 is not likely to disengage from the pressing portion 38 and the fixing part 48. In the present embodiment, as shown in FIG. 5, the wire 21 extends from the wire land 46 to the fixing part 48 along the upper surface 40A of the circuit board 40, and thus when fixing the wire 21 using the crimping part 37, the solder is not likely to be cracked.

Ultimately, the busbar units 22 to which the wire 21 is connected are disposed on the protector 70 (see FIGS. 2 and 3). The busbars 30 are accommodated in the busbar accommodation recess 71. The circuit boards 40 are arranged inside the busbar accommodation recess 71 and the coupling part 73 so as not to be in direct contact with the protector 70. The wires 21 are arranged inside the coupling part 73 and the wire routing recess 72. In the wire routing recess 72, the wires 21 are fixed by the wire locking pieces 72A. With this, the manufacturing of the wiring module 20 is complete.

In the above-described method for manufacturing the wiring module 20, the wire 21 is soldered to the wire land 46 and then the wire 21 is fixed by the crimping part 37, but a configuration is also possible in which the wire 21 is fixed by the crimping part 37 and then the wire 21 is soldered to the wire land 46. In this case, since the wire 21 extends from the wire land 46 to the fixing part 48 along the upper surface 40A of the circuit board 40, even if the wire 21 is fixed by the crimping part 37, the core wire 21A of the wire 21 on the wire land 46 is not likely to rise and soldering is easy (see FIG. 5).

Note that in the method of manufacturing the wiring module 20, the wire 21 may also be soldered in the process of soldering the chip fuse 47 and the like to the circuit board 40, and then the circuit board 40 to which the wire 21 is connected may be fixed to the busbar 30.

Functions and Effects of Embodiment 1

According to Embodiment 1, the following functions and effects are achieved.

The wiring module 20 according to Embodiment 1 is directed to a wiring module 20 configured to be attached to a plurality of power storage elements 11 having electrode terminals 12A and 12B. The wiring module 20 includes: a plurality of busbar units 22; and wires 21 connected to the busbar units 22. Each of the busbar units 22 includes: a busbar 30 connected to the electrode terminals 12A and 12B; a circuit board 40; and a fixing means 53 configured to fix the circuit board 40 to the busbar 30. A conductive path 43 is routed on the circuit board 40, and the conductive path 43 includes: a connection land 45 electrically connected to the busbar 30; and a wire land 46 soldered to the corresponding wire 21. The busbar 30 includes a crimping part 37 that fixes the wire 21, and the wire 21 is interposed between the crimping part 37 and the circuit board 40.

With such a configuration, the wire 21 is fixed by the crimping part 37 and the circuit board 40, and thus electrical connection between the wire 21 and the circuit board 40 is not likely to be lost even when an external force is applied to the wire 21.

In Embodiment 1, the circuit board 40 includes a fixing part 48 that holds and fixes the wire 21 in cooperation with the crimping part 37, the circuit board 40 has a first surface (upper surface 40A) on which the wire land 46 is formed, and the fixing part 48 is in contact with the wire 21 on the first surface.

With this configuration, the wire land 46 is formed on the first surface of the circuit board 40, and the fixing part 48 that holds and fixes the wire 21 in cooperation with the crimping part 37 is in contact with the wire 21 on the first surface, and thus the wire 21 does not need to be bent between the wire land 46 and the fixing part 48. Accordingly, when the wire 21 is soldered and then the wire 21 is fixed by the crimping part 37 and the fixing part 48, solder crack is prevented. Also, when the wire 21 is fixed by the crimping part 37 and the fixing part 48 and then the wire 21 is soldered, the soldering is easy.

In Embodiment 1, the circuit board 40 has a cutout 60 formed in the vicinity of the crimping part 37.

With this configuration, it is possible to discharge fluid attached to the circuit board 40 from the cutout 60. Accordingly, the conductive paths 43 are prevented from short-circuiting via fluid on the circuit board 40.

In Embodiment 1, the crimping part 37 is disposed inside the cutout 60.

According to this configuration, the cutout 60 enables positioning of the busbar 30 and the circuit board 40.

The wiring module 20 according to Embodiment 1 further includes a protector 70 configured to hold the busbars 30, and the circuit boards 40 have a clearance between the circuit boards 40 and the protector 70.

With this configuration, it is possible to handle the plurality of busbar units 22 as one piece using the protector 70. Also, by providing a clearance between the circuit boards 40 and the protector 70, the circuit boards 40 are not likely to be subjected to a stress from the protector 70, making it possible to prevent solder crack.

In Embodiment 1, the conductive path 43 includes a chip fuse 47 provided between the connection land 45 and the wire land 46.

With this configuration, even if conductive paths 43 short-circuit and an overcurrent occurs, it will be possible to restrict the overcurrent from flowing from the corresponding power storage elements 11 to the conductive paths 43.

In Embodiment 1, the busbar 30 includes a first fixation hole 34, and the circuit board 40 includes a second fixation hole 50, and the fixing means 53 is a rivet 54, and the rivet 54 has a shaft portion 55 configured to be inserted into the first fixation hole 34 and the second fixation hole 50, and a head portion 56 that is formed at an end of the shaft portion 55 and has a diameters greater than hole diameters of the first fixation hole 34 and the second fixation hole 50.

With this configuration, it is possible to fix the circuit board 40 to the busbar 30 using the rivet 54.

The wiring module 20 according to Embodiment 1 is a vehicular wiring module 20 to be electrically attached to the plurality of power storage elements 11 mounted on a vehicle 1.

Embodiment 2

Embodiment 2 of the present disclosure will be described with reference to FIGS. 12 to 16. In a wiring module 120 according to Embodiment 2, configurations of a crimping part 137 of a busbar 130 and a fixing part 148 of a circuit board 140 are different from the corresponding components of Embodiment 1. In the following, description of the same configurations, functions and effects as in Embodiment 1 is omitted. The same reference numerals as those in Embodiment 1 are given to the same members as those in Embodiment 1.

Figure 15:
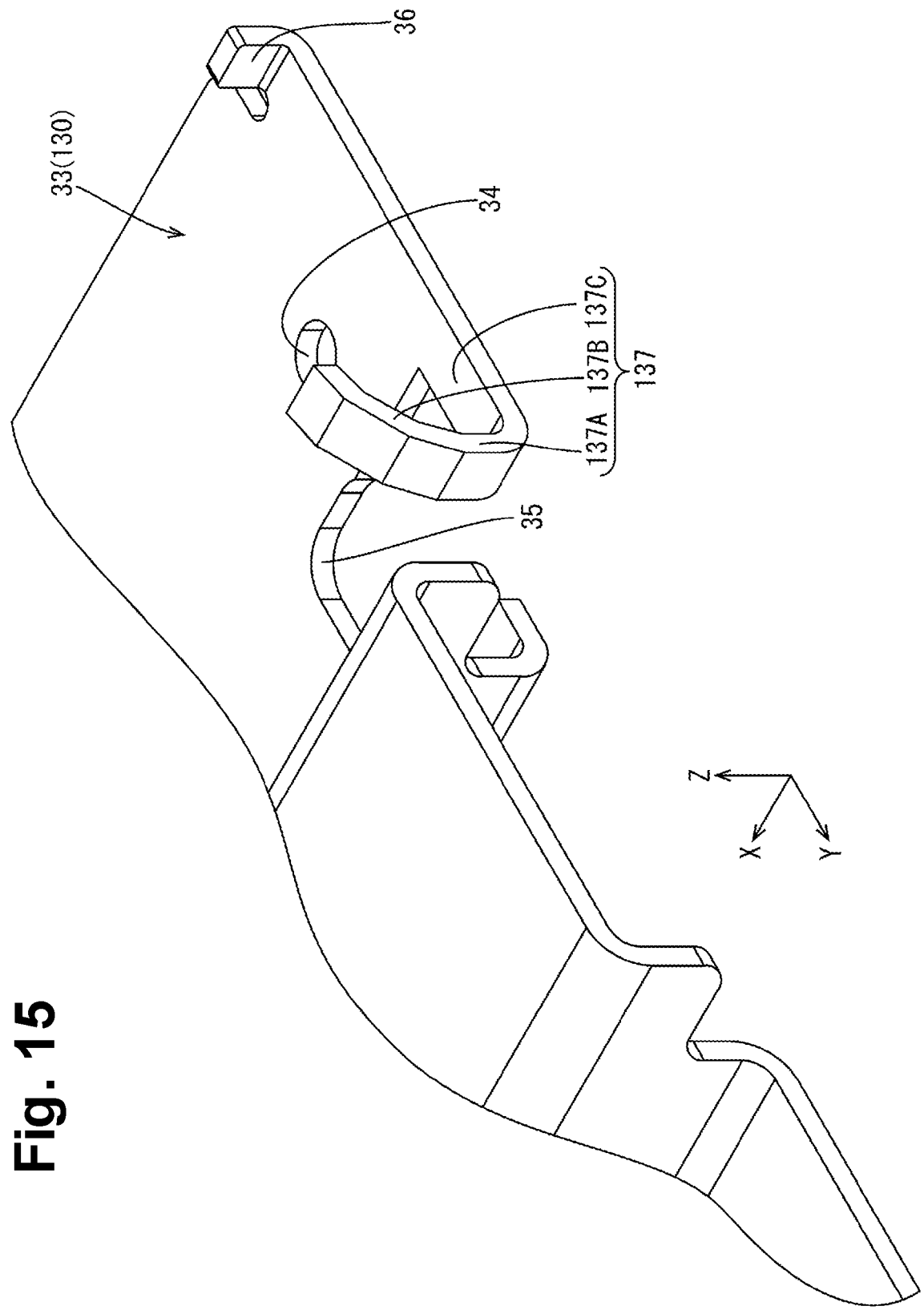
FIG. 15 is an enlarged perspective view of a busbar, illustrating the circuit board placement portion.
Figure 16:
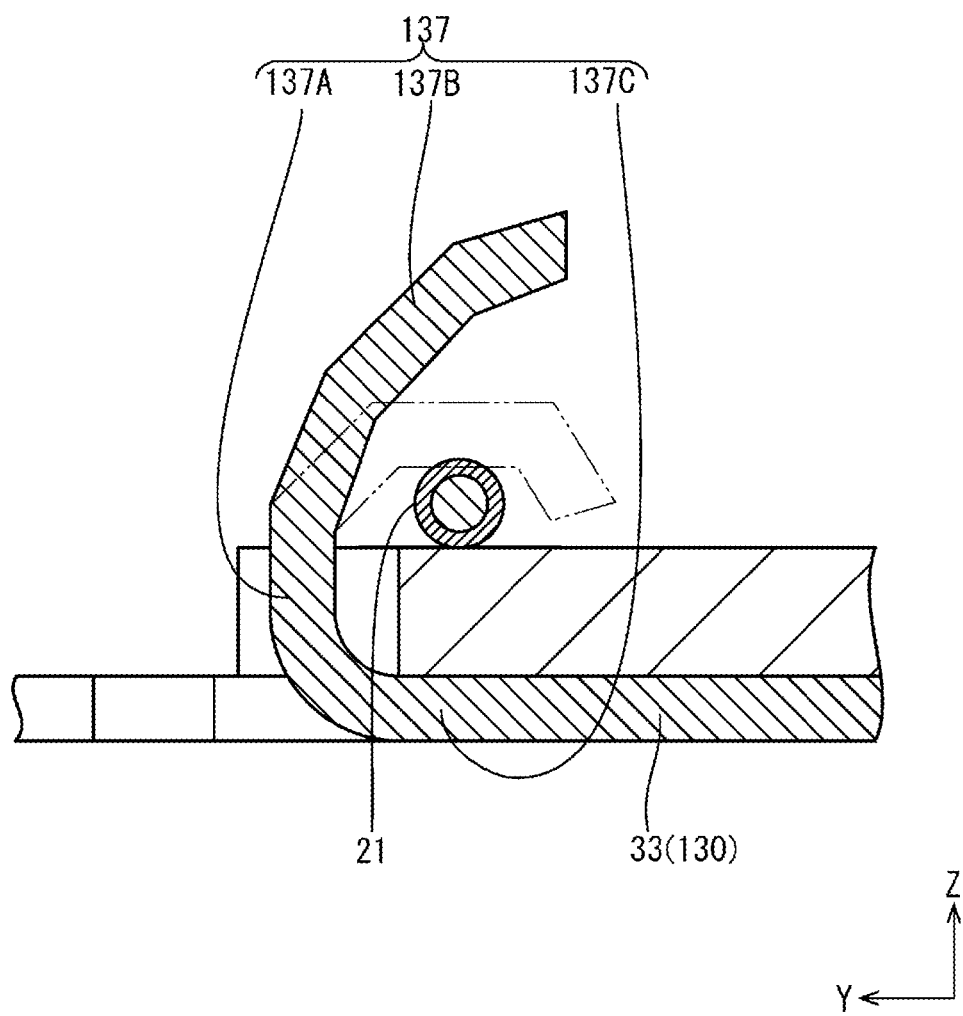
FIG. 16 illustrates how the wire is crimped by a crimping part, in the cross-sectional view taken along the line C-C in FIG. 12.

As shown in FIGS. 15 and 16, the crimping part 137 of the busbar 130 includes a support portion 137C extending leftward from the circuit board placement portion 33 on the base end side, a rising portion 137A rising upward from the support portion 137C, and a bent portion 137B gently bent to the right. The crimping part 137 is substantially C-shaped when viewed in the front-rear direction.

Figure 13:
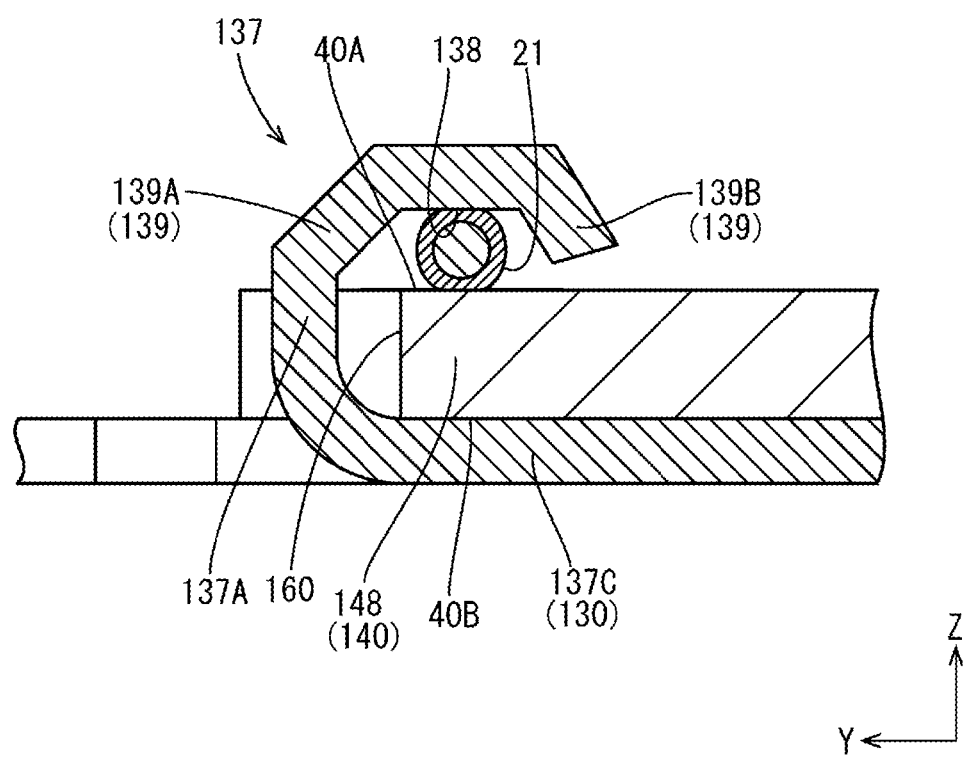
FIG. 13 is a cross-sectional view taken along a line C-C in FIG. 12.

As shown in FIG. 16, when fixing the wire 21, the bent portion 137B is bent so that the leading end of the crimping part 137 is located to the right of the wire 21. In a state in which the wire 21 is fixed as shown in FIG. 13, the crimping part 137 includes a pressing portion 138 that presses the wire 21, and a position restricting portion 139 that restricts the wire 21 from disengaging from the pressing portion 138 and the circuit board 140. The position restricting portion 139 is composed of a first position restricting portion 139A on the base end side of the crimping part 137, and a second position restricting portion 139B on the leading end side of the crimping part 137.

Figure 12:
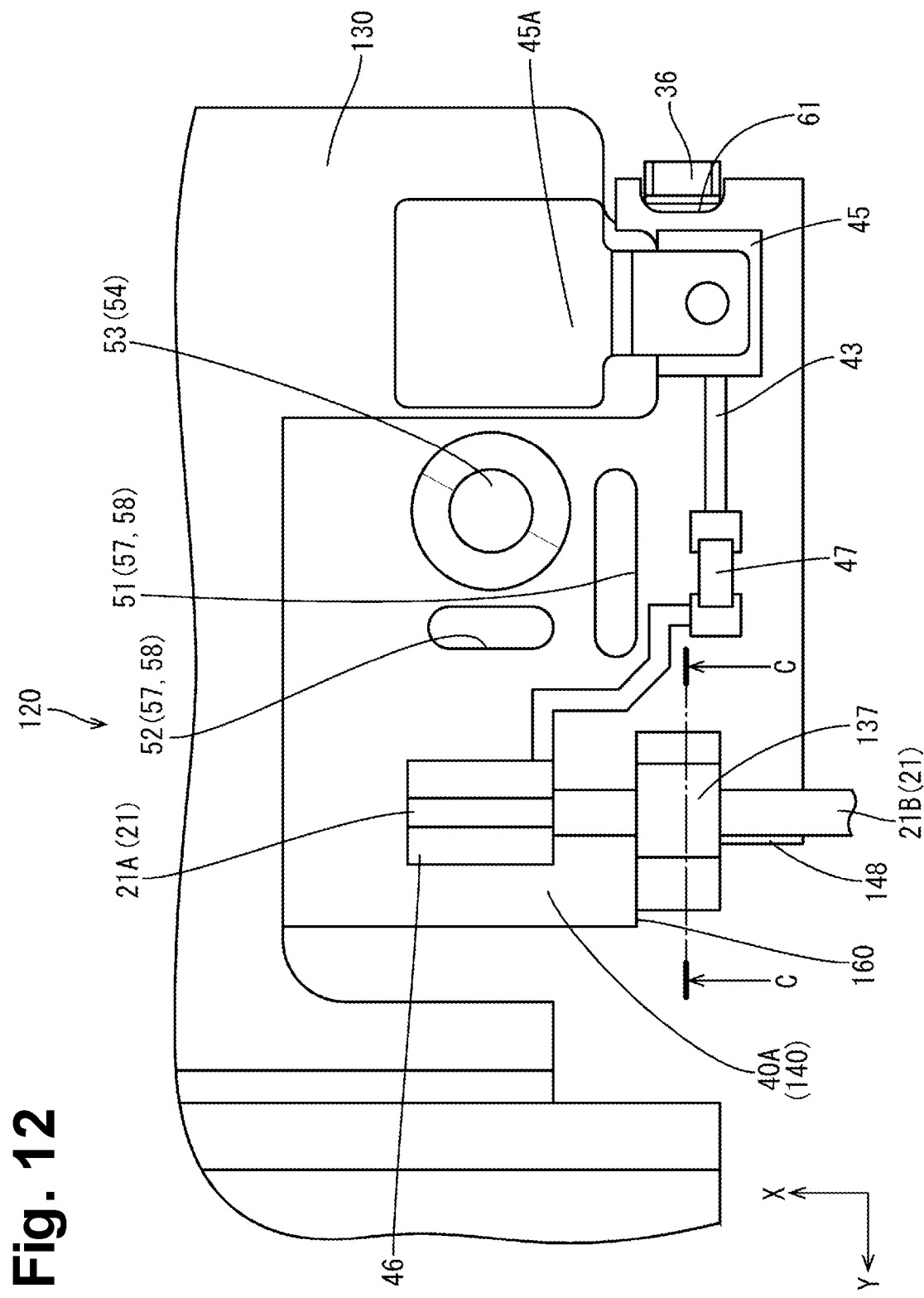
FIG. 12 is an enlarged plan view of the wiring module, illustrating a circuit board according to Embodiment 2.

As shown in FIG. 13, the circuit board 140 includes the fixing part 148 configured to hold and fix the wire 21 in cooperation with the crimping part 137. The fixing part 148 is in contact with the wire 21 on the upper surface 40A (an example of the first surface) of the circuit board 140. That is to say, as shown in FIG. 12, the wire 21 extends from the fixing part 148 to the wire land 46 along the upper surface 40A of the circuit board 140.

As shown in FIG. 13, the fixing part 148 is in contact with the support portion 137C of the crimping part 137 on the lower surface 40B (an example of the second surface) of the circuit board 140. Accordingly, the fixing part 148 is supported by the busbar 30 from below. Also, the fixing part 148 is disposed so as to be wrapped inside the crimping part 137, together with the wire 21. That is to say, not only the wire 21 is held by and interposed between the fixing part 148 and the pressing portion 138, but also the fixing part 148 is held by and interposed between the support portion 137C and the wire 21. Accordingly, the state in which the wire 21 is fixed by the crimping part 137 and the fixing part 148 is easily maintained.

Cutout

Figure 14:
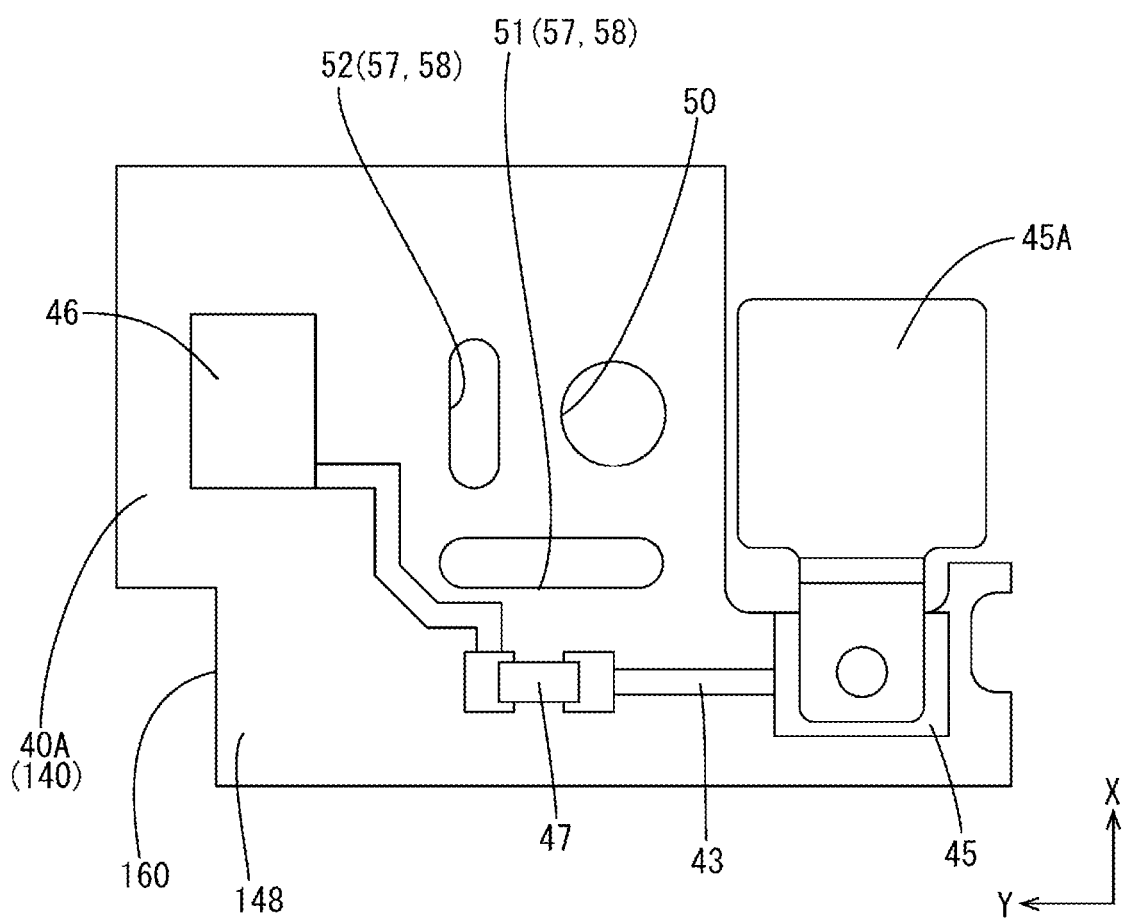
FIG. 14 is a plan view illustrating the circuit board.

As shown in FIG. 14, a cutout 160 is provided in the outer edge portion of the circuit board 140 on the left rear side. The cutout 160 is identical to the second cutout 60B in Embodiment 1 (see FIG. 8). Note that the circuit board 140 does not have any first cutout 60A (located on the right side of the fixing part 48) as in Embodiment 1. As shown in FIG. 13, the rising portion 137A of the crimping part 137 is accommodated in the cutout 160.

Functions and Effects of Embodiment 2

According to Embodiment 2, the following functions and effects are achieved.

In Embodiment 2, the circuit board 140 has a second surface (lower surface 40B) located on a side opposite to the first surface (upper surface 40A), and the fixing part 148 is in contact with the busbar 130 (support portion 137C) on the second surface.

With this configuration, since the fixing part 148 is in contact with the busbar 130 on the second surface, it is possible to support the fixing part 148 using the busbar 130.

Also, the state in which the wire 21 is fixed by the crimping part 137 and the fixing part 148 can further be stabilized.

Embodiment 3

Embodiment 3 of the present disclosure will be described with reference to FIGS. 17 and 18. In the following, description of the same configurations, functions and effects as in Embodiments 1 and 2 is omitted. The same reference numerals as those in Embodiments 1 and 2 are given to the same members as those in Embodiments 1 and 2.

Figure 17:
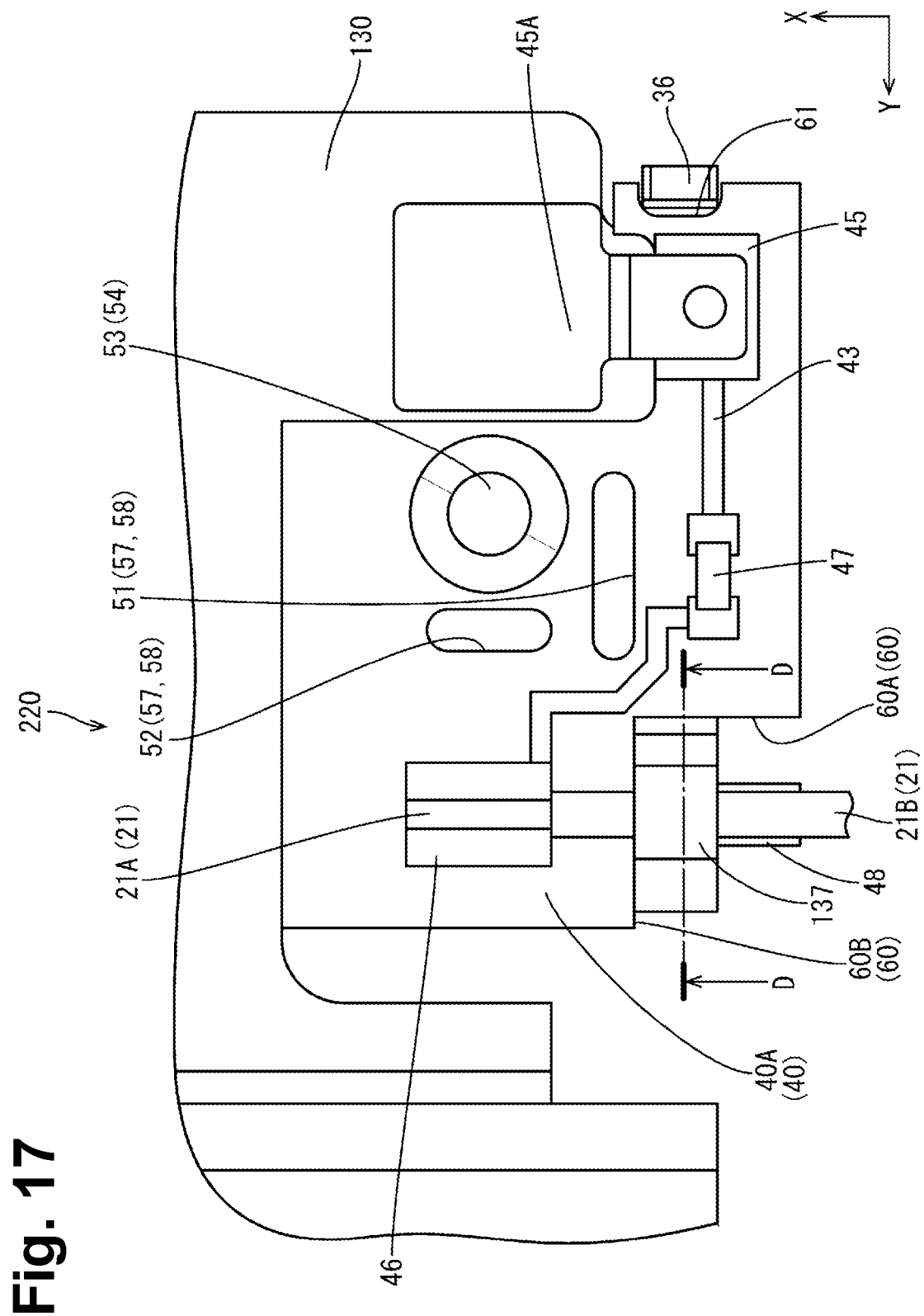
FIG. 17 is an enlarged plan view of the wiring module, illustrating a circuit board according to Embodiment 3.

As shown in FIG. 17, a wiring module 220 according to Embodiment 3 includes the circuit board 40 of Embodiment 1, and the busbar 130 of Embodiment 2. Specifically, when comparing Embodiment 3 with Embodiment 2, there are minor differences in lengths and curves of the crimping part 137 of the busbar 130, but the components are substantially the same members, and thus are not distinguished.

Figure 18:
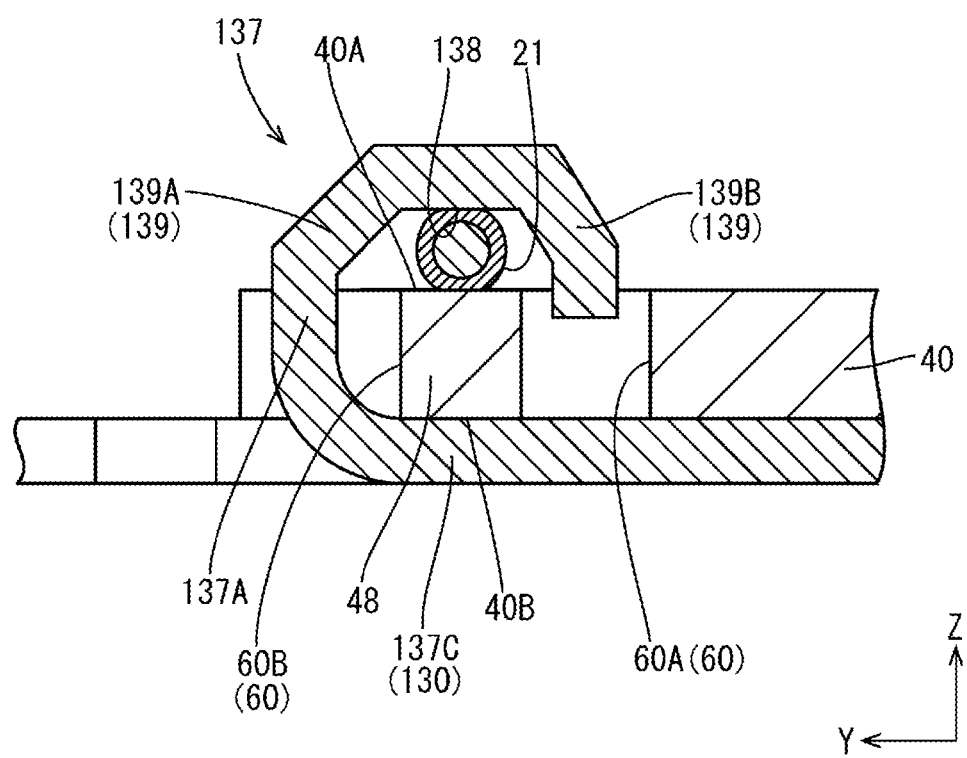
FIG. 18 is a cross-sectional view taken along a line D-D in FIG. 17.

As shown in FIG. 18, in Embodiment 3, the rising portion 137A is disposed inside the second cutout 60B. The leading end of the crimping part 137 can be accommodated inside the first cutout 60A.

As shown in FIG. 18, the fixing part 48 is in contact with the support portion 137C of the crimping part 137 on the lower surface 40B (an example of the second surface) of the circuit board 40. Accordingly, the fixing part 48 is supported by the support portion 137C from below. Also, the state in which the wire 21 is fixed by the crimping part 137 and the fixing part 48 is easily maintained.

Other Embodiments (1) In the above-described embodiments, the fixing means 53 for fixing the circuit board 40, 140 to the busbar 30, 130 is the rivet 54, but the present invention is not limited to this. For example, a screw or an adhesive may be used as the fixing means.

(2) In the above-described embodiments, the circuit board 40, 140 has a configuration in which it includes the chip fuse 47, but the present invention is not limited to this. A configuration is also possible in which the circuit board does not include any chip fuse.

(3) In the above-described embodiments, the wiring modules 20, 120, 220 has a configuration in which it includes the protector 70, but the present invention is not limited to this. A configuration is also possible in which the wiring module does not include any protector.

LIST OF REFERENCE NUMERALS

1 Vehicle
2: Power storage pack
3: PCU
4: Wire harness
10: Power storage module
11: Power storage element
12A, 12B: Electrode terminal
20,120,220: Wiring module
21: Wire
21A: Core wire
21B: Insulating coating
22: Busbar unit
30, 130: Busbar
33: Circuit board placement portion
34: First fixation hole
35: Recess
36: Positioning projection
37, 137: Crimping part
37A, 137A: Rising portion
37B, 137B: Bent portion
137C: Support portion
38, 138: Pressing portion
39, 139: Position restricting portion
39A, 139A: First position restricting portion
39B, 139B: Second position restricting portion
40, 140: Circuit board
40A: Upper surface
40B: Lower surface
42: Insulating plate
43: Conductive Path
45: Connection land
45A: Metal piece
46: Wire land
47: Chip fuse
48: Fixing part
50: Second fixation hole
51: First through hole
52: Second through hole
53: Fixing means
54 Rivet
55 Shaft portion
56: Head portion
56A: Upper head portion
56B: Lower head portion
57: Insulation hole
58: Drainage hole
60: Cutout
60A: First cutout
60B: Second cutout
61: Positioning recess
70: Protector
71: Busbar accommodation recess
72: Wire routing recess
72A: Wire locking piece
73: Coupling part
S: Solder

The invention claimed is:

1. A wiring module configured to be attached to a plurality of power storage elements having electrode terminals, the wiring module comprising:
a plurality of busbar units; and
a corresponding wire connected to each of the busbar units,
wherein each of the busbar units includes: a busbar connected to the electrode terminals; a circuit board including a fixing part and a first surface; and a fixer configured to fix the circuit board to the busbar,
a conductive path is routed on the circuit board,
the conductive path includes: a connection land electrically connected to the busbar; and a wire land formed on the first surface and soldered to the corresponding wire,
the busbar includes a crimping part that fixes the corresponding wire,
the corresponding wire is interposed between the crimping part and the circuit board,
wherein the fixing part holds and fixes the corresponding wire in cooperation with the crimping part, and
wherein the fixing part is in contact with the corresponding wire on the first surface.

2. The wiring module according to claim 1,
wherein the circuit board has a second surface located on a side opposite to the first surface, and the fixing part is in contact with the busbar on the second surface.

3. The wiring module according to claim 1,
wherein the circuit board includes a cutout formed in the vicinity of the crimping part.

4. The wiring module according to claim 3,
wherein the crimping part is disposed inside the cutout.

5. The wiring module according to claim 1, further comprising a protector configured to hold the busbars,
wherein the circuit boards have a clearance between the circuit boards and the protector.

6. The wiring module according to claim 1,
wherein the conductive path includes a chip fuse provided between the connection land and the wire land.

7. The wiring module according to claim 1,
wherein the busbar has a first fixation hole,
the circuit board has a second fixation hole,
the fixer is a rivet, and
the rivet includes a shaft portion configured to be inserted into the first fixation hole and the second fixation hole, and a head portion that is formed at an end of the shaft portion and has a diameter greater than hole diameters of the first fixation hole and the second fixation hole.

8. The wiring module according to claim 1,
wherein the wiring module is a vehicular wiring module configured to be electrically attached to the plurality of power storage elements mounted on a vehicle.

\* \* \* \* \*